(12) United States Patent
Hartigan et al.

(10) Patent No.: US 6,832,176 B2
(45) Date of Patent: Dec. 14, 2004

(54) METHOD AND SYSTEM FOR TRACKING AND REPORTING TIME SPENT ON TASKS

(75) Inventors: Karen Wynne Hartigan, Washington, DC (US); Samuel Wolfram Hunter, Alexandria, VA (US); Dennis Evgenievick Loukonine, Sterling, VA (US); Brien Francis Morgan, McLean, VA (US); Omid E. Kia, Rockville, VA (US)

(73) Assignee: XI Software, Washington, DC (US)

( * ) Notice: Subject to any disclaimer, the term of this patent is extended or adjusted under 35 U.S.C. 154(b) by 0 days.

(21) Appl. No.: 10/227,304

(22) Filed: Aug. 26, 2002

(65) Prior Publication Data

US 2003/0204367 A1 Oct. 30, 2003

(Under 37 CFR 1.47)

Related U.S. Application Data

(60) Provisional application No. 60/315,094, filed on Aug. 27, 2001, and provisional application No. 60/314,935, filed on Aug. 24, 2001.

(51) Int. Cl.[7] .................................................. G04F 5/00
(52) U.S. Cl. ........................ 702/178; 702/186; 702/187; 702/188; 709/224
(58) Field of Search ........................... 702/178, 186, 702/187, 188; 709/224

(56) References Cited

U.S. PATENT DOCUMENTS

| | | | |
|---|---|---|---|
| 5,675,510 A | 10/1997 | Coffey et al. | 709/224 |
| 5,696,702 A | 12/1997 | Skinner et al. | 702/186 |
| 6,115,680 A | 9/2000 | Coffee et al. | 702/187 |
| 6,185,514 B1 | 2/2001 | Skinner et al. | 702/188 |

*Primary Examiner*—John Barlow
*Assistant Examiner*—Hien Vo
(74) *Attorney, Agent, or Firm*—Piper Rudnick LLP; Steven B. Kelber

(57) ABSTRACT

A tracking system and method automatically tracks time spent by end users in different applications on the end users' computers while performing tasks. The time keeping application is integrated with at least some of the applications on the end user computers. This integration allows the time keeping application to detect and track events, such as the opening and closing of files, that signify a change in the task being performed by the end users by receiving messages directly from the other applications being used by the end user. The time keeping software may automatically suggest a categorization for the task based on at least one criteria.

34 Claims, 15 Drawing Sheets

FIG. 7

| URL ▽ | Unit Cost |
|---|---|
| ☐ http://www.yahoo.com/ | 0.00 |
| ☑ http://www.westlaw.com/ | 0.00 |
| ☑ http://www.msnbc.com/ | 17.50 |
| ☐ http://www.msn.com/ | 0.00 |
| ☑ http://www.lexisnexis.com/ | 55.00 |
| ☑ http://www.abcnews.com/ | 32.50 |

| Timekeeper ID ▽ | First Name | Last Name | Roles | Approval By | Account Status |
|---|---|---|---|---|---|
| ⊕test2 | test | 2 | Timekeeper; Approv... | | MustChangePassw |
| ⊕test1 | Test | 1 | Timekeeper; | | Enabled |
| ⊕shunter | Sam | Hunter | Timekeeper; Approv... | | Enabled |
| ⊕System | Default | Login | Administrator | | Enabled |
| ⊕NotTimekeeper | test | NotTimekeeper | Approver; | | |

Administrator — Folder Items:
- All
  - Timekeepers
  - Approvers
  - Administrators Entries / Users / URLs 0 users selected in All — Users — Connected to RKS

METHOD AND SYSTEM FOR TRACKING AND REPORTING TIME SPENT ON TASKS

This application claims the benefit of U.S. provisional application Ser. No. 60/315,094, entitled "Computerized Event Detection and Tracking System," filed on Aug. 27, 2001, and U.S. provisional application Ser. No. 60/314,935, also entitled "Computerized Event Detection and Tracking System," filed on Aug. 24, 2001, both of which are incorporated by reference herein.

BACKGROUND OF THE INVENTION

1. Field of the Invention

The invention relates to a computerized method and system for tracking and reporting time spent on tasks.

2. Discussion of the Background

It is often necessary or desirable to keep track of the time spent by individuals while performing a task. Nowhere is this more true than in the business world, where fees are often determined in whole or in part by the amount of time spent by individuals in performing tasks on behalf of a customer or client. For example, professionals such as attorneys and accountants often bill their clients based on the number of hours worked on behalf of their clients. As another example, government contracts often specify that contractors will be paid based on the number of hours spent by employees such as engineers while working on a project such as designing or maintaining a system.

Even in situations where fees are not determined based on the time spent on a task, tracking this information is often desirable. For example, in a law firm, it is often desirable for the "information technology" group that is responsible for maintaining the firm's computer systems to track the amount of time spent on tasks such as installing a new version of the Windows™ operating system. This information might be useful to the firm's leadership in the future when determining whether to upgrade to still newer versions of that operating system. As another example involving a law firm, even when services are provided on a fixed fee basis, there may be a need to track time both for evaluating whether the amount of the fixed fee is appropriate for future fixed fee arrangements for similar tasks, and for the purposes of awarding "production" or "sweat" bonuses, which are based on the number of hours an attorney has worked on behalf of the firm over a time period such as a year.

The on-line advertising industry is another example of a situation in which tracking time is required, as advertising fees are sometimes calculated based on time spent viewing a web site carrying the advertising. There are many other examples in which it is desirable or necessary to track time spent on tasks.

Many of the aforementioned examples involve tracking time spent on tasks performed on a computer. For example, an attorney working on behalf of a client may spend time preparing a document on a personal computer or researching a topic on the Internet or on specialized legal research services such as LEXIS™ (which may or may not be accessed via the Internet). Accountants may spend time working on spreadsheet on their computers. Engineers may spend time preparing computer code or simulating circuit designs on computerized simulation programs such as the SPICE™ program.

It should also be recognized that it is often necessary to track time spent on different projects for the same customer. For example, a government defense contractor may not only have to separately track time spent on behalf of various different U.S. and foreign government agencies, it may also have to separately track time spent on different projects. In the legal profession, patent attorneys often separately track time spent working on different patent applications for the same client as well as for different clients. This categorization is often referred to as client/matter categorization in the legal profession. In the case of large corporations, it is often necessary to categorize tasks by division as well as particular client. For example, attorneys representing a large corporation may have to identify a particular task as being associated with a specific matter (e.g., the Jones litigation), a specific division (e.g., the Otis Elevator division), and a specific client (e.g., United Technologies Corp.). Thus, there is often a need for time tracking methods and systems to recognize a multi-level hierarchical categorization of tasks:

Several methods have been used in the past to track time spent on tasks. They all share, to various degrees, a basic problem—they require too much time and effort on the part of the timekeeper. Each minute the timekeeper spends tracking and categorizing time spent on a task subtracts from the total amount of time available to actually work on the task. Worse still, the time spent on tracking time does not usually generate revenue. Thus, an associate at a law firm who spends 8 hours at his desk on a particular day only has seven and a half hours available to work on behalf of clients if it takes that attorney a half hour to record and report his time, and this 8 hour day worked by the attorney results in only seven and a half billable hours for the firm. Thus, it is very important that the method used to track time be as quick and painless as possible for the timekeepers.

One of the simplest methods is for each timekeeper (e.g., employee, attorney, engineer, etc.) to manually record his or her time with paper and pen. This method has several drawbacks. It is time consuming and frustrating for timekeepers. Furthermore, timekeepers often forget to record their time and must often "figure it out later," sometimes days and even weeks later. This leads to inaccuracies and lost time as timekeepers may forget which projects they were working on and how much time was worked on a particular day. Thus, a timekeeper attempting to remember what tasks were performed on a day last week may decide to record four hours on a first task for client number one and four hours on a second task for client number two, while in reality three and half hours were spent on the first task, four and a half hours were spent on the second task, and an additional half hour was spent on a third task. In such a situation, client number one has been charged too much and the firm for which the timekeeper works has lost revenues in the form of fees that could have been charged to client number three.

Several timekeeping products have appeared recently which purport to automate the timekeeping process, but these products are only a minimal improvement over the manual methods. For example, TIMESLIPS, available from Best Software and TABS III from Software Technology, Inc., both provide time tracking software for use by professionals such as attorneys and accountants. These products typically require the timekeeper to manually enter the time spent on each task and assign this time to a specific customer and project. While such programs may be an improvement over the paper and pen method described above in some respects (e.g., they facilitate the generation of invoices to clients), programs such as these are only a minimal improvement (and, when the timekeeper is a poor typist, may actually be a detriment rather than an improvement) over the paper and pen method with respect to the amount of time required on the part of timekeepers to track the time they spend on tasks.

Some known systems include a stopwatch feature. In such systems, the timekeeper sets up one or more stopwatches, each of which is associated with a particular task. These stopwatches may be displayed graphically on a computer screen as the timekeeper works. When the timekeeper starts working on one task, the timekeeper starts the stopwatch associated with that task. When one stopwatch is activated, all other stopwatches are halted. When the timekeeper switches to a second task, the timekeeper activates the stopwatch associated with the second task. This automatically causes the first stopwatch to halt and any other stopwatches to remain halted. This method is somewhat of an improvement over the manual methods described above. However, it too suffers from several drawbacks. First, the timekeeper must manually enter task identification information (e.g., a client or project name) associated with each stopwatch. Second, the timekeeper may forget to start a new stopwatch as the timekeeper starts a new task. Thus, for example, a timekeeper may start using the WORD™ word processing program to edit a first document for a first client, at which time a first stopwatch is activated. When the timekeeper is finished editing the first document, the timekeeper may then stay in the WORD program and start editing a second document for a second client. If the timekeeper forgets to manually create and/or start the second stop watch, the record of time spend performing the first and second tasks will be inaccurate.

Other known systems go a step further. For example, software referred to as PROJECT TRACKER 2, sold by Vakcer, Corp., automatically starts and stops stopwatches as a user switches from one application (e.g., WORD, EXCEL, OUTLOOK, etc.) to another. However, this program has several drawbacks. First, it only records information concerning the application from information available from the operating system such as the title in the title bar of the window in which the application is running. The PROJECT TRACKER 2 system is not integrated with any of the applications it is tracking (as used herein, "integrated" means being configured to interact directly with an application, such as through that application's API (application program interface), rather than simply obtaining information from the operating system).

A second problem with the PROJECT TRACKER 2 system is that is has no facility to intelligently associate its stopwatches with a specific client or matter. Rather, the user must enter this information manually. Third, the PROJECT TRACKER 2 system apparently lacks facilities for a hierarchical client/matter task categorization. Instead, separate tasks are treated the same whether they are associated with the same client or with different clients.

Fourth, the PROJECT TRACKER 2 system only allows one project to he open at a time, regardless of how many applications are open. Thus, if a user wishes to switch back and forth between working on a Word document open in a first window for one client/matter, and working on an Excel spreadsheet open in a second window for another client/matter, the user must continually open and close projects to ensure that the all the time spent working on the two separate tasks is not assigned to a single client/matter.

Still other systems are described in U.S. Pat. Nos. 5,675,510; 5,696,702; 5,963,614; 6,115,680; and 6,185,514. All of these systems include drawbacks that make them less than optimal.

What is needed is a method and system for tracking time that is easy and simple to use and that minimizes the time required to track time spent by a user on a particular task.

SUMMARY OF THE INVENTION

The present invention meets the aforementioned need to a great extent by providing a computerized time tracking system that is automated and convenient for timekeepers to use. In one aspect of the invention, a time keeping software application resident on one or more end user computers automatically tracks time spent by end users in different applications while performing tasks on the end users' computers. In preferred embodiments, the time keeping application is integrated with at least some of the other applications on the end user computers. This integration allows the time keeping application to detect and track events, such as the opening and closing of files, that signify a start, stop, or change in the task being performed by the end users.

In another aspect of the invention, the time keeping software automatically and intelligently suggests task categorization. These suggested categorizations may be based on criteria such as the directory in which a file being processed by an application is located, and the content of the document itself (e.g., the recipient field of an email). While these categorizations may not always be fully correct, they often are and in these cases the need for the end user to enter the information manually is eliminated, thereby saving time.

In yet another aspect of the invention, the activity information (time spent, categorization, etc.) collected for a task is used to generate reports of the timekeepers' activities. These reports may be used to generate invoices, which may be generated by the time keeping application itself or which may be used as an input into an accounting application that generates invoices. In preferred embodiments, a multi-level hierarchical of task categorization is maintained. This facilitates management of the information collected by the timekeeping application. The information from multiple end user computers may be aggregated on a centralized server.

In still another aspect of the invention, the time keeping application tracks time spent on performing tasks, which may be different from the time spent by a user in an application. To this end, preferred embodiments of the invention include an inactivity timeout feature that will automatically cause the time keeping application to stop a timer associated with a window in which an application is running if the user has not performed an action (such as depressing a key) for a period of time that exceeds a threshold.

BRIEF DESCRIPTION OF THE DRAWINGS

A more complete appreciation of the invention and many of the attendant aspects, features and advantages thereof will be readily obtained as the same become better understood by reference to the following detailed description when considered in connection with the accompanying drawings, wherein:

FIG. 7 is a screen shot of a list of URLS according to a preferred embodiment of the invention.

FIGS. 9(a), (b) and (c) are screen shots of a various windows associated with a ledger application according to a preferred embodiment of the invention.

FIG. 10 is a screen shot of an activity report according to a preferred embodiment of the invention.

DETAILED DESCRIPTION OF PREFERRED EMBODIMENTS

The present invention will be discussed with reference to preferred embodiments of computerized time tracking applications. Specific details, such as types of data and methods of tracking events, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent in their performance.

Figure 1:
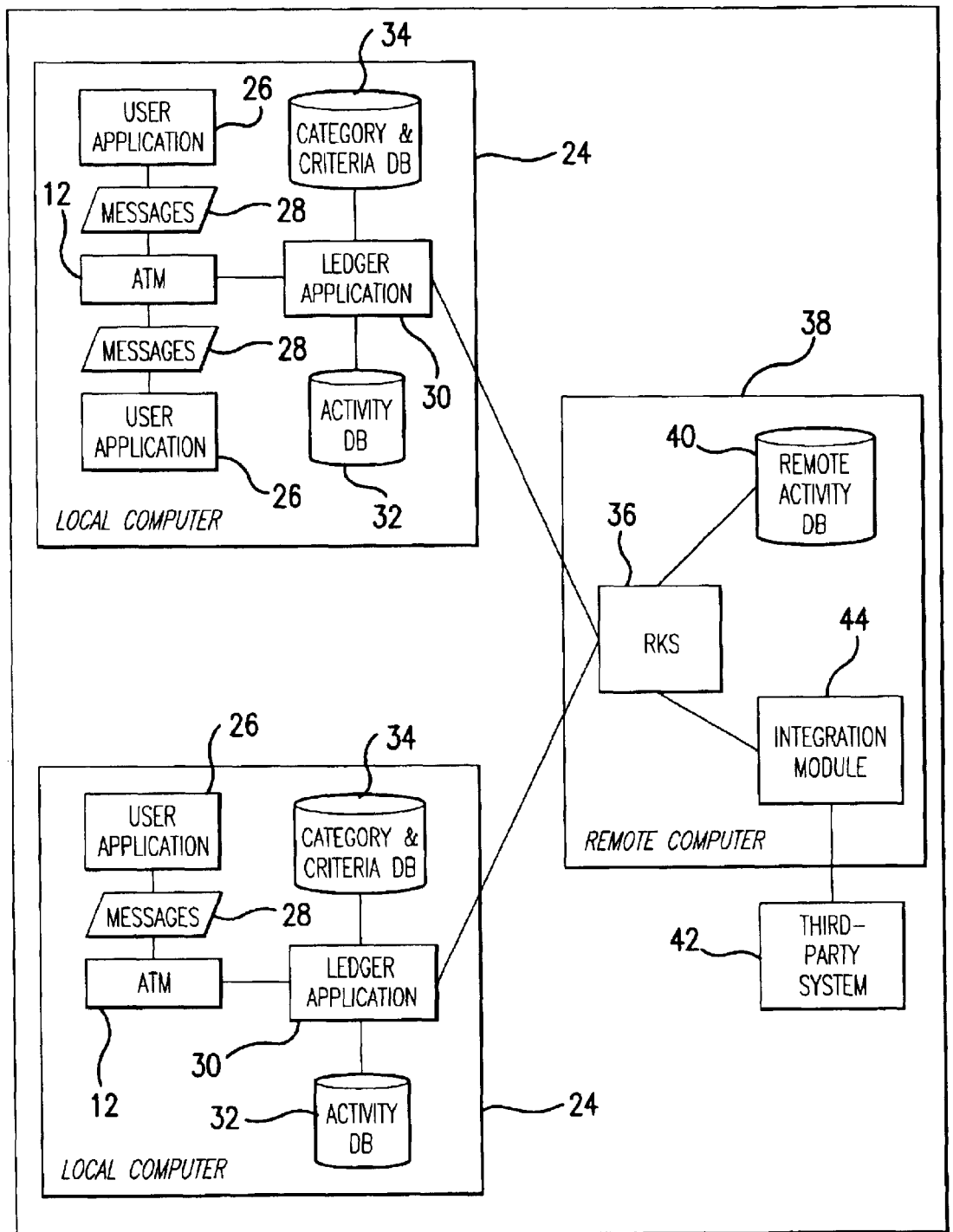
FIG. 1 is a high level system diagram of a multiple end user and centralized server embodiment of the invention.

Referring now to the drawings, wherein like reference numerals designate identical or corresponding parts throughout the several views, FIG. 1 is a high level logical block diagram of a time tracking system 100 according to an embodiment of the present invention. The system 100 includes two end user computers 24, each connected to a centralized record keeping computer 38, which in turn is connected to a third party system 42.

Figure 2:
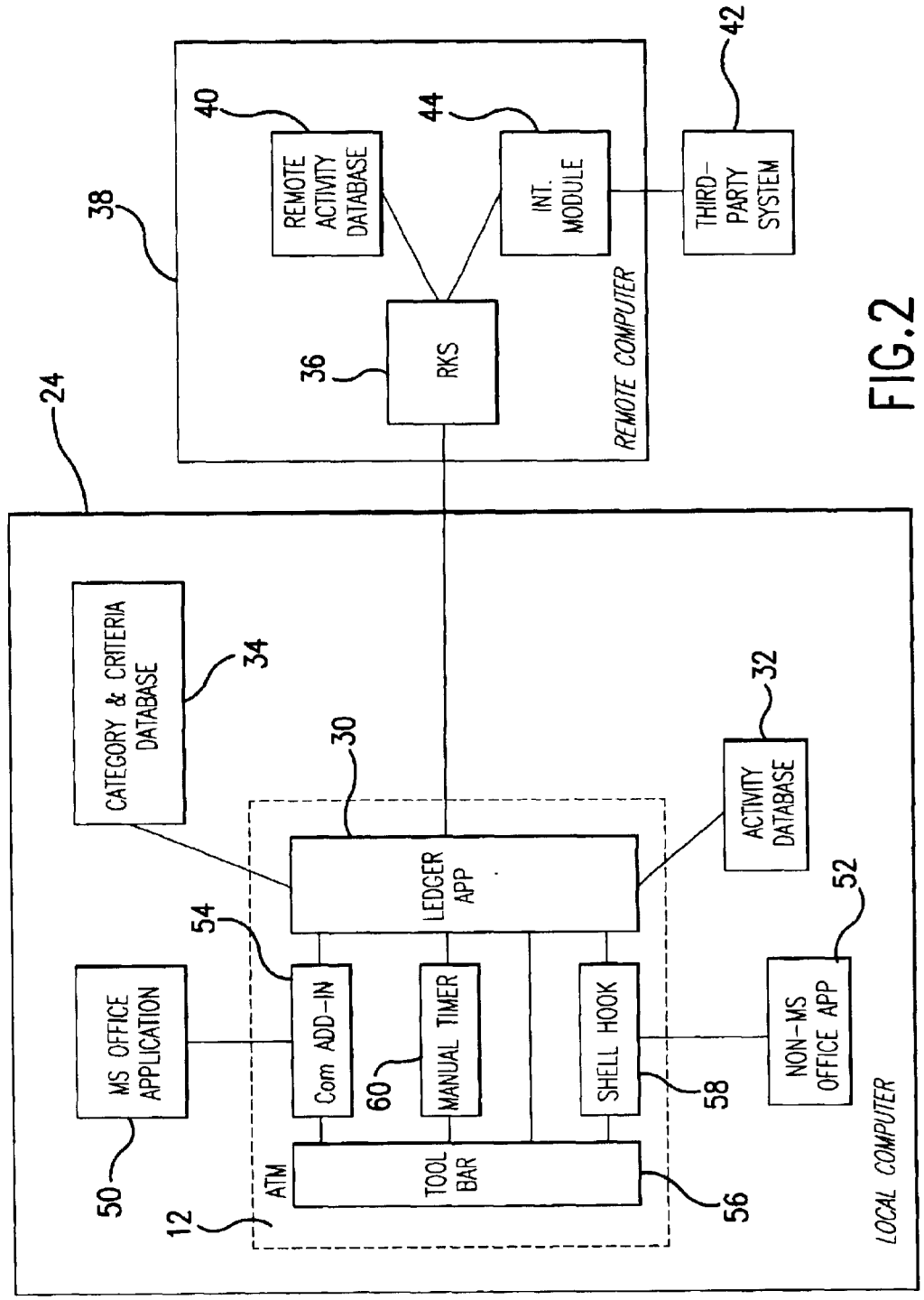
FIG. 2 is a block diagram of an activities tracking module according to a preferred embodiment of the present invention.

Each local computer 24 is configured with one or more user applications 26. These user applications 26 can be any computer application that may be used to perform tasks. Examples of commonly used applications include word processors, email applications, spreadsheets, internet browsers, and graphics tools. There are an infinite number of such applications that may be used to perform tasks, and any number of such applications may be installed on any end user computer. In FIG. 1, one of the end user computers 24 is configured with one such application, while the other end user computer 24 is configured with two such applications. It will be understood by those of skill in the art that the number of applications shown in FIG. 2 is small for the sake of simplicity and that most end user computers 24 will generally have more than two such applications installed.

Each of the end user computers 24 is also configured with a local timekeeper application, which includes an activity tracking module, or ATM 12, a ledger application 30, a category and criteria database 34, and an activity database 32.

The main function of the ATM 12 is to track time spent by the user on different tasks. It should be noted that the time spent by a user in an application is not necessarily the time spent by a user in performing a task. For example, simply opening an email program does not in and of itself signify the start of a task. On the other hand, opening an email message, even if the email message is opened solely to read the message, is the start of a task. Similarly, opening a word processing application without opening a document is not the start of a task, whereas actually opening a document and beginning to type is the start of a task. An important aspect of the invention is the inclusion of features that prevent time spent in an application without any activity from being tracked and reported as time spent in performing a task. One such feature is the inactivity timeout feature, discussed further below in connection with FIG. 8, that will automatically "stop" a timer associated with an application if the user has not performed any activity in that application for a period of time that exceeds a threshold. In a preferred embodiment, the time keeping application monitors depressions of keys on the keyboard and buttons on the mouse to detect whether or not the user is actively using the application. Another such feature is that the time keeping application will not report a task in the case where a user opens a new document in an application but then fails to do anything further.

In performing its function of tracking time spent by the user on different tasks, the ATM 12 sends and receives messages 28 associated with each of the user applications 26 on the end user computer 24. The messages 28 are messages indicative of events that may signify a change in task. Examples of such messages include the opening and closing files, the sending of download requests for different URLs, the opening and closing of applications themselves (to the extent that such opening and closing signifies the start or end of a task), and, in the case of windows-type multi-tasking operating systems, the activation and deactivation of windows. These messages 28 may be sent by the ATM to or from the operating system (not illustrated in FIG. 1) installed on the end user computer 24. Furthermore, in embodiments in which the ATM 12 has been integrated with applications 26 installed on the end user computers 24, these messages 28 may also include messages sent to or from the applications 26 directly, for example, through the applications' APIs.

The ATM 12 tracks the time spent by the end user in performing tasks. In performing this time tracking function, the ATM 12 can be thought of logically as a series of stopwatches, with one stopwatch for each application 26 or each use of an application 26 for a specific file, URL, etc., with the messages 28 and any inactivity timeouts acting as the start and stop buttons on the stopwatch. For example, the ATM 12 will receive a message 28 when the user opens a document with a word processing application (the manner in which these messages 28 are sent and received will be discussed in further detail below; however, it should be understood that "receiving a message" as discussed herein includes the concept of polling an operating system or application API by the ATM 12) and will also receive a message when the document is closed (the opening and closing of the document may or may not be concurrent with the opening and closing of the application; hence the qualification above that the opening and closing of applications are tracked only to the extent that they signify the beginning or ending of a task). Also, in embodiments of the invention used with windows-type operating systems, the ATM 12 will also receive messages when the window in which the word processing application is running becomes active or inactive (or focused or unfocused), or, where applicable, when a window within the word processing program that contains a document becomes active or inactive.

From these messages, the ATM 12 automatically assigns the time spent to activities—e.g., processing a document on a word processor, viewing a website with a browser, etc. Thus, for example, if the ATM 12 receives a message that a file X was opened by a word processor Y at time A, the window in which the word processor Y was running was deactivated at time B, reactivated at time C, and the file was closed at time D, the ATM 12 will detect and report two activities concerning file X and application Y, both of which will be associated with a single task, preferably by either the ledger application 30 or the RKS 36. In other embodiments of the invention, only a single activity with total time T=((B−A)+(D−C)) will be reported. In yet other embodiments, a single activity with the individual start and stop times A, B, C and D may be reported in place of or in addition to the total time T. The activities and times associated therewith detected by the ATM 12 are communicated to the ledger application 30. The ledger application 30 is responsible for categorizing these activities and associated times and for storing the activity, time and category information in the activities database 32. The time at which the categorization for an activity is assigned may vary. In some embodiments, the ATM 12 will report to the ledger application 30 when it detects that a new activity has started (e.g., a new email message has been received, a new file has been opened, etc.). In other embodiments, the categorization may occur at another time, such as when the activity has been completed or when the activity has first been halted. As discussed above, the categories may be different entries in a single level categorization scheme (e.g., each activity is assigned to a single project), or may organized according to a multi-level hierarchy (e.g., a client and matter in a two-level hierarchy).

The manner in which the categorization is accomplished may also vary. As discussed above, one way in which to implement categorization is to simply force the user to enter the categorization information. This is apparently the manner in which the PROJECT TRACKER 2 application operates. However, as discussed above, forcing a user to manually enter the categorization information is frustrating for the user and requires the user's time, both of which are undesirable.

One way in which the present invention minimizes the frustration and time required to categorize tasks is to store categorization information in the category and criteria database 34. This stored categorization information may come from a variety of sources. For example, categorization information manually entered for previously-performed tasks may be stored and presented to the user in a menu, thereby eliminating the need for a user to repeatedly type the same categorization information each time a task in the same category is performed. In networked embodiments of the invention, the categorization information may be obtained from information entered by other users. Furthermore, the categorization information may originate with the third party system 42 that has categorization data, such as an accounting system, a document management system, or a central database containing this information.

However, preferred embodiments of the invention do more than simply present stored categorization data to the user for selection. Preferred embodiments of the invention make intelligent decisions as to which of the stored categorization data should be associated with a task. These decisions are made through the use of criteria stored in the category and criteria database 34. In some preferred embodiments, these types of criteria are predetermined for each integrated application and a default set of criteria are used for non-integrated applications. The number and type of criteria may vary for different applications. Examples of criteria for word processing applications and spread sheet applications are file name and file directory. An exemplary criteria for a web browser is a URL. Exemplary criteria for email are subject, sender, and recipients (both direct recipients and cc and bcc recipients). In other preferred embodiments, more elaborate criteria are used.

A scoring system may be used to select a suggested category based on the criteria. The scoring system may take any number of different forms. One embodiment of a scoring system assigns a score based on a percentage. As a simple example, assume a system in which 50 different categories comprising client/matter combinations are stored in the category and criteria database 34, and in which the sender of the email is the single criteria used for selecting a suggested category from among the 50 stored categories. Further assume that the recipient of the email has received 8 different emails from this particular sender in the past, and that of these 8 emails, two relate to one client/matter and the other six relate to six different client/matters. The scoring system assigns a score of 25 to the client/matter to which the two emails relate (2 out of 8=25%), a score of 12.5 to each of the client/matters to which only a single email relates (1 out of 8=12.5%), and a score of 0 to the 43 other categories stored in the criteria and category database 34. These scores are then used as a basis for selecting a suggested category. In this simple example, only a single criteria—the sender—is used. However, as discussed above multiple criteria may be used in connection with an email. In these embodiments, the scores for each criteria are combined (e.g., by averaging the scores for each of the criteria, by adding the scores for each criteria, etc.). It should be understood that the specific scoring system discussed above is merely exemplary and that any number of other scoring systems may be used.

It should be noted that, in some embodiments, the ledger application may not always provide a suggested category for a given activity. This will occur, for example, when there is no basis for making a suggestion (in the context of the above example, this will occur when an email is received from a sender for the first time). However, this may also occur when there is some basis for suggesting a category, but that basis is not sufficiently certain. For example, in the context of the example discussed above, one possibility is for the ledger application to simply select the client/matter with the highest score, in this case is the client matter with the score of 25. However, it is apparent that this selection is uncertain, especially if neither of the two emails relating to the same subject matter were the most recent of the 8 total emails. To prevent such a tenuous selection, a threshold score, e.g. 40, may be used. If a threshold of 40 were used in the above example, the ledger application would not suggest any client/matter even though there is some basis for selecting the client matter even with the score of 25.

In some preferred embodiments, artificial intelligence techniques may be used and the ledger application may use feedback from the user in the former of user-directed assignments of activities to categories to 'learn' the appropriate criteria. Such techniques are well known in the art and will not be discussed in further detail herein to avoid obscuring the invention.

Activities and their associated times and categorization information are reported to a centralized computer system 38 in some embodiments of the invention. The centralized computer system 38 comprises a record keeping server, or RKS, 36, a remote activity database 40, and an integration module 44. The RKS 36 is responsible for communication with the ledger applications 30 in the end user computers 24 and for storing the activity information and associated data in the remote activity database 40. The RKS 36 also facilitates approval and revision of activities reported by end users by supervisory and administrative personnel. The integration module 44 is responsible for formatting the data in the remote activity database 40 in a form suitable for use by a third party system (e.g., an accounting system and/or a billing system) 42 and reporting the formatted information to that third party system 42. The specific formats and requirements of the third party system 42 are beyond the scope of the present invention.

The system 100 described above is a centralized system in which each end user computer 24 reports to a centralized computer system 38. In other embodiments of the invention, no such centralized computer system 38 exists. In such embodiments, the data in the activity database 32 at each end user computer 24 may be processed locally, either by the timekeeping application itself (e.g., to create activity reports) or by a third party application resident on the end user computer 24. Alternatively, the end user computers 24 may report the information in the activity database 32 to a third party central server. In such embodiments, the end user computer 24 will include a module similar to the integration module 44 that will format the data in the activity database 32 in the format required by the third party central server, and will report the formatted data to the third party central server.

FIG. 2 is a block diagram of a system 200, including an ATM 12, adapted for a computer running the WINDOWS™ operating system and having installed applications including Microsoft Office applications and non-Microsoft Office applications. In the system 200, the ATM 12 comprises several modules including a Toolbar module 56, a Manual Timer module 60, a COM Add-In module 54, and a Shell Hook module 58.

Figure 3:
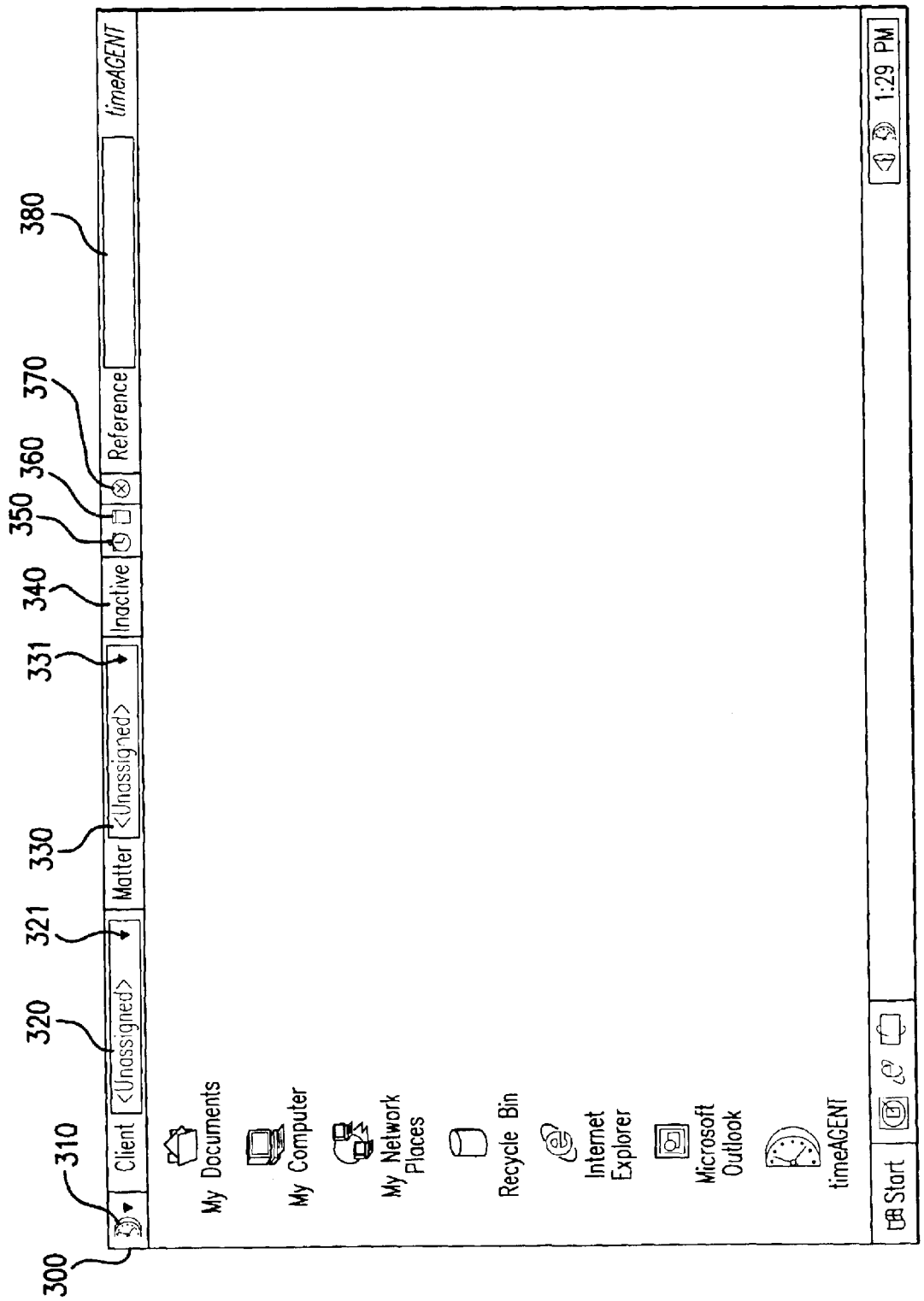
FIG. 3 is a screen shot of a toolbar in an inactive state according to a preferred embodiment of the invention.

The Toolbar module 56 is responsible for providing a toolbar used by the end user to interact with the system 200. An exemplary toolbar 300 is illustrated in FIG. 3, which illustrates a toolbar as it would appear when no applications other than the time tracking application are running, and in FIG. 4, which illustrates the toolbar 300 as it would appear when tasks are being performed. The toolbar 300 includes a menu icon 310, which, when activated, allows the user to start or stop a timer, edit a time card, delete a time card, or open a manual timecard (timecard refers to a display of the electronic record of an activity, which may be all or part of a task).

Figure 4:
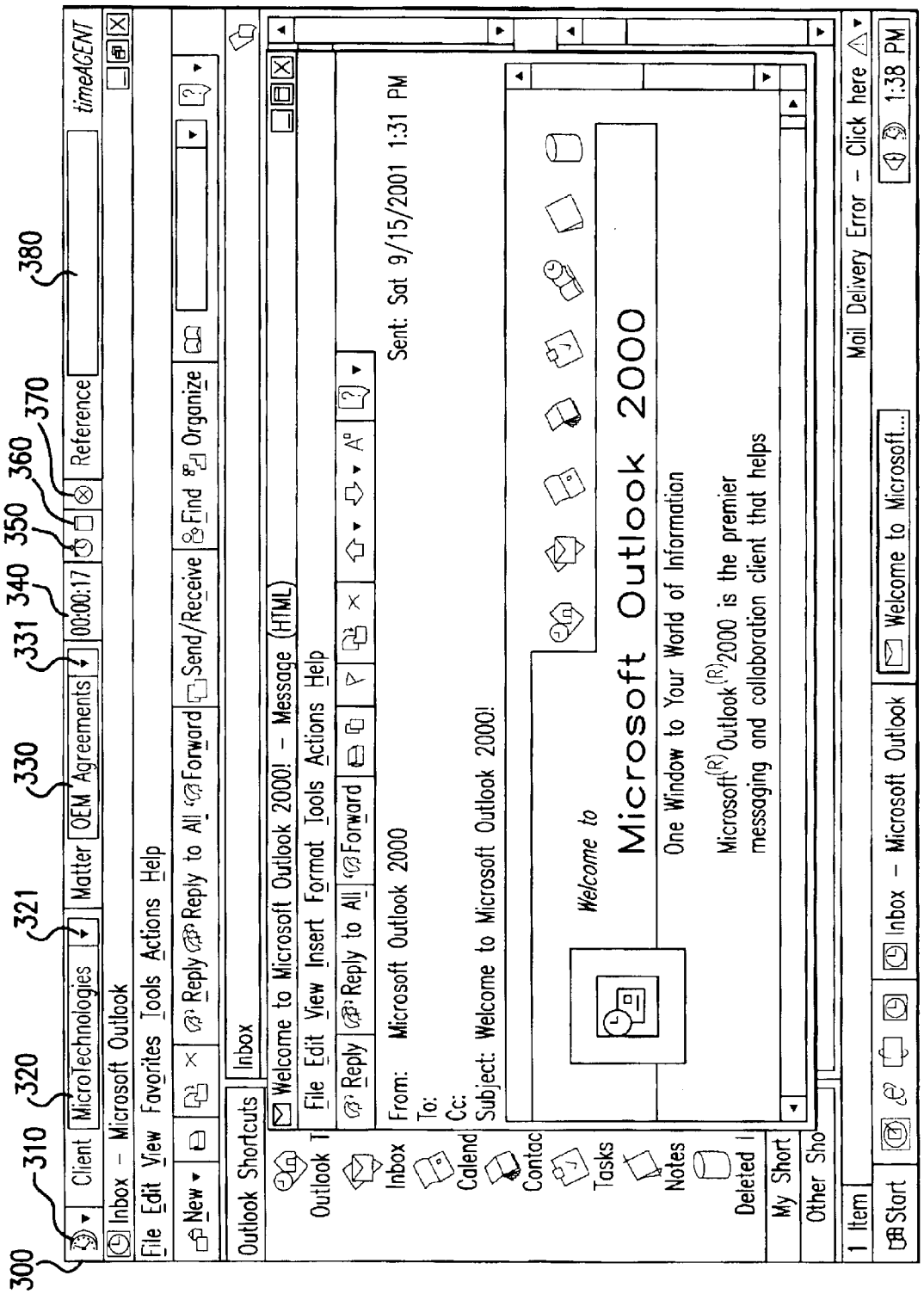
FIG. 4 is a screen shot of the toolbar of FIG. 3 in an active state.

The toolbar 300 also includes one or more fields for displaying category information. In FIGS. 3 and 4, the specific fields are a client field 320 and a matter field 330 in which the client and matter associated with an active task are displayed (these fields indicate unassigned in FIG. 3 when no task is currently being performed). The client and matter fields 320, 330 include pull down menu buttons 321, 331 which may be used to select a client and matter from among the clients and matters stored in the category and criteria database 34. The toolbar module 56 obtains this information via the ledger application 30.

Figure 5:
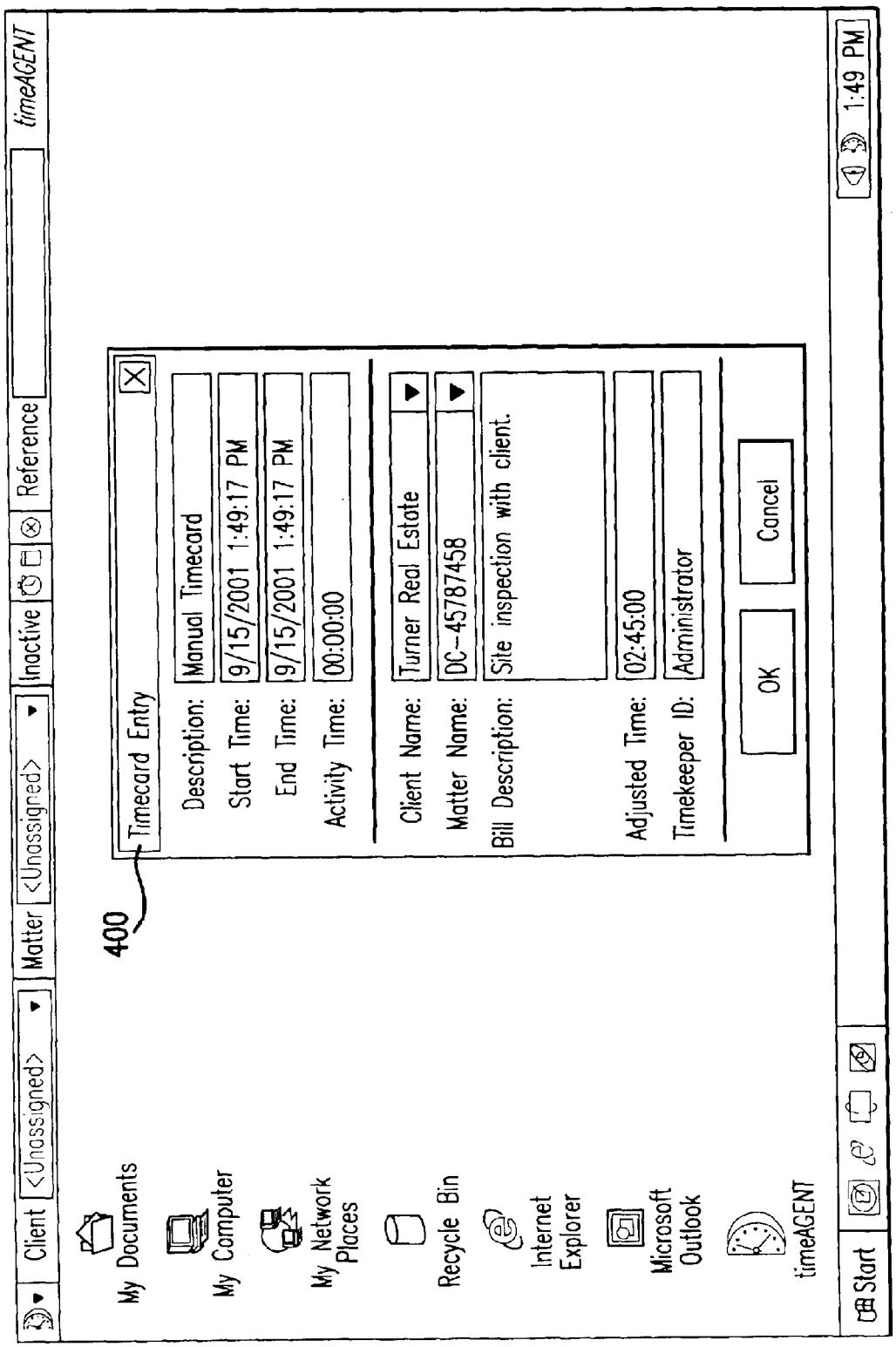
FIG. 5 is a screen shot of a manual timecard according to a preferred embodiment of the invention.

The toolbar 300 further includes a timer field 340. This field 340 contains the running time for an active application when other applications are active and reads "inactive" when no other applications are running. A manual timer icon 350 launches a manual timer, which will be discussed in further detail below. A manual timecard icon 360 allows the user to create a new, blank timecard and record information about an activity on the timecard. An exemplary manual timecard 400 is illustrated in FIG. 5. The manual timecard feature is provided so that activities that occur away from the computer and for which no manual timer has been created (e.g., the site inspection shown on the timecard 400) can be entered into the activity database 32.

Referring now back to FIGS. 3 and 4, a terminate icon 370 allows the user to stop the time keeper application. Finally, a reference field 380 allows an end user to enter a short description of the activity for future reference. This reference line is available to the user so the user can enter a brief description for reference purposes. This brief description may included in an invoice sent to a client to explain what specific activity was being performed (e.g., the short description may read "Editing Newco Contract"), and it is also sent with the category information to the RKS 36.

The operation of the manual timer module 60 of FIG. 2 will now be described. As discussed above, a manual timer acts as a "stopwatch" for activities such as phone calls that are not related to any application on the end user computer 24. Use of a manual timer (as compared to other methods such as pen and paper) for tracking non-computerized tasks provides two important advantages. First, they allow the use of stored categorization data from the category database 34, which may eliminate the need to manually enter this information. Second, the activation and deactivation of these timers automatically starts and stops other timers in the ATM 12 that are actively tracking other, computerized tasks.

Figure 6:
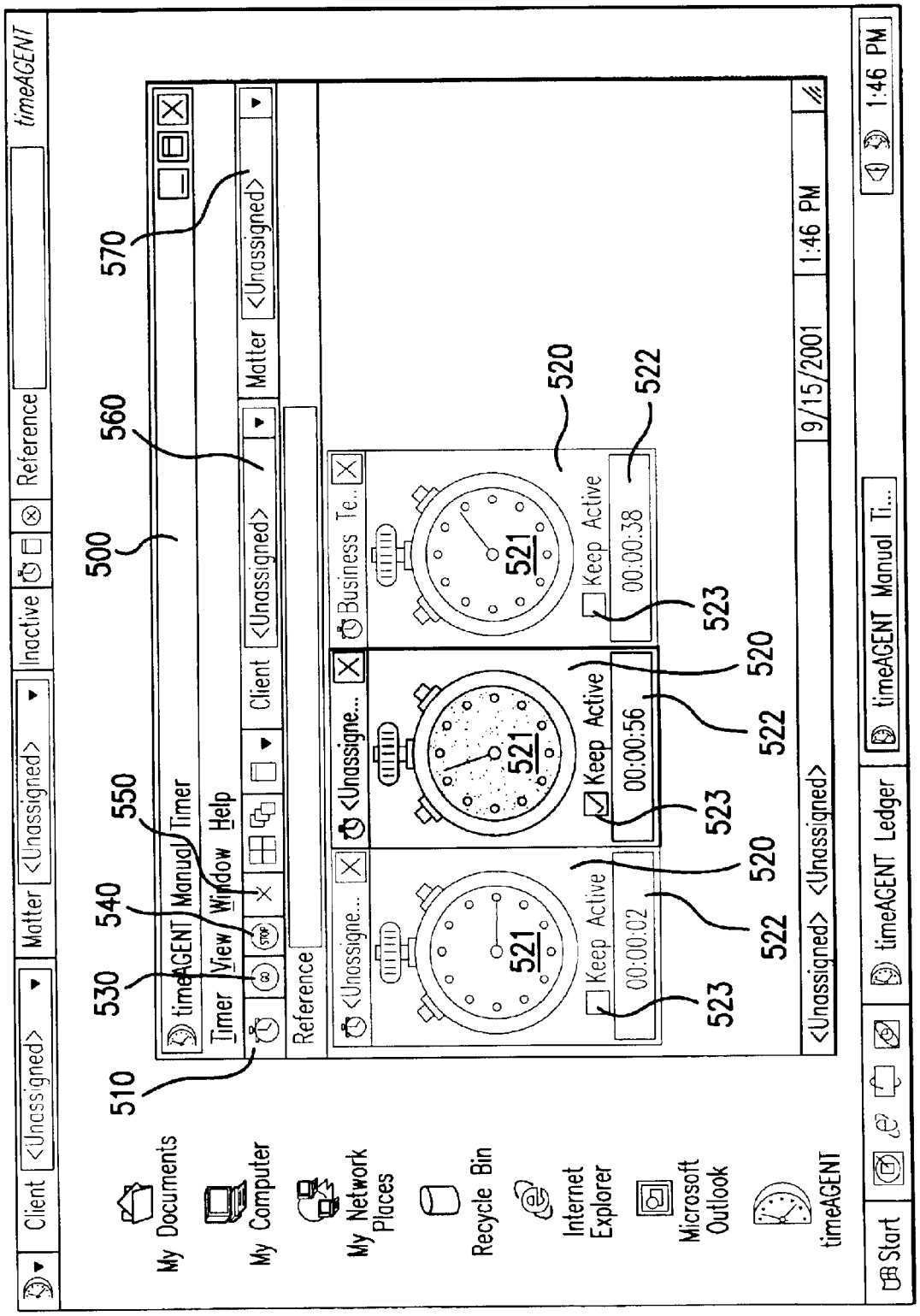
FIG. 6 is a screen shot of a manual timecard window according to a preferred embodiment of the invention.

A manual timer is invoked by the user by clicking on the manual timer button 350 in the toolbar 300 discussed above in connection with FIGS. 3 and 4. When the user clicks on the manual timer icon 350, the manual timer module 60 opens a manual timer window 500 as shown in FIG. 6. The manual timer window 500 includes a create manual timer icon 510 that activates a manual timer 520 (which itself is a window). As shown in FIG. 6, several manual timers 520 may be created. Each manual timer 520 includes a symbolic stopwatch 521, a time field 522, and a keep active check box 523. If the keep active checkbox 523 is not checked, the manual timer 520 will only keep running when it is active. If the keep active checkbox 523 is checked, the manual timer 520 will keep running even if its window is deactivated. The manual timer window 500 also includes go, stop, and close icons 530, 540, 550, which start, stop, and close the manual timers 520. An activity may be reported to the ledger application 30 each time a manual timer is stopped. The manual timer window 500 also includes client and matter fields 560, 570 which function in the same manner as the client and matter fields 320, 330 of FIGS. 3 and 4.

The operation of the Com Add-In module 54 of FIG. 2 will now be discussed. Preferably, there is no specific display associated with the Corn Add-In module 54 and the operation of Corn Add-In module 54 is transparent to the user. In some embodiments, however, a toolbar similar to the toolbar 300 of FIGS. 3 and 4 is created for each active application. The Corn Add-In module 54 is the module responsible for integrating the time keeping application with MS Office applications 50 such as MS Word, MS Excel, MS Outlook, MS PowerPoint, and others and maintaining timers for these applications. This module preferably utilizes the designer classes supported by the APIs for these MS Office applications. Preferably, the Corn Add-In module is notified by the APIs each time a document in the application 50 is created, destroyed, activated, opened, closed, or otherwise interacted with by the user. These events are used to start and stop the timers for the various applications. An activity may be reported to the ledger application 30 each time one of the timers stops.

The shell hook module 58 is responsible for tracking activities for non-MS Office applications 52. The shell hook module may or may not be integrated with these applications 52. For non-integrated applications, the shell hook module 58 interacts with the operating system to determine when these non-integrated applications 52 start and stop. The shell hook module 58 may be integrated with applications such as Microsoft's Internet Explorer (IE). Preferably, the shell hook module 58 uses a technique referred to as subclassing (which is described at http://msdn.microsoft.com/library/default.asp?url=/library/en-us/winui/winui/windowsuserinterface/windowing/windowprocedures/aboutwindowprocedures.asp)

to subclass the IE address bar edit control, which allows the shell hook module 58 to intercept messages from the operating system relating to changes in URL in the address bar and take actions (e.g., reporting different activities) based on the change. For example, the criteria database 34 may have stored therein a list of URLs such as the list shown in FIG. 7 that should be reported as separate activities when viewed by an end user.

Figure 8A:
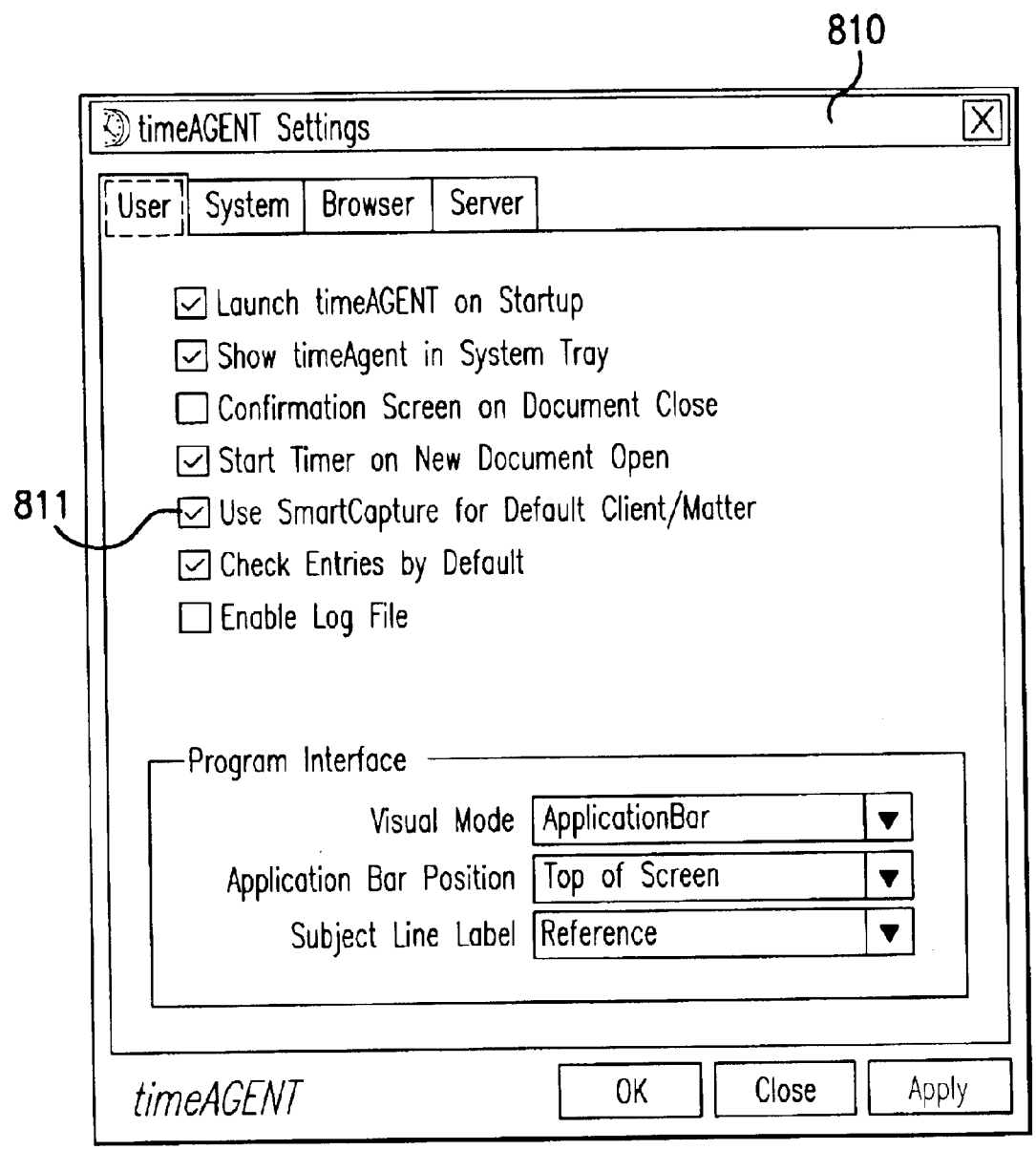
FIGS. 8(a), (b), (c) and (d) are screen shots of a various settings windows according to a preferred embodiment of the invention.
Figure 8B:
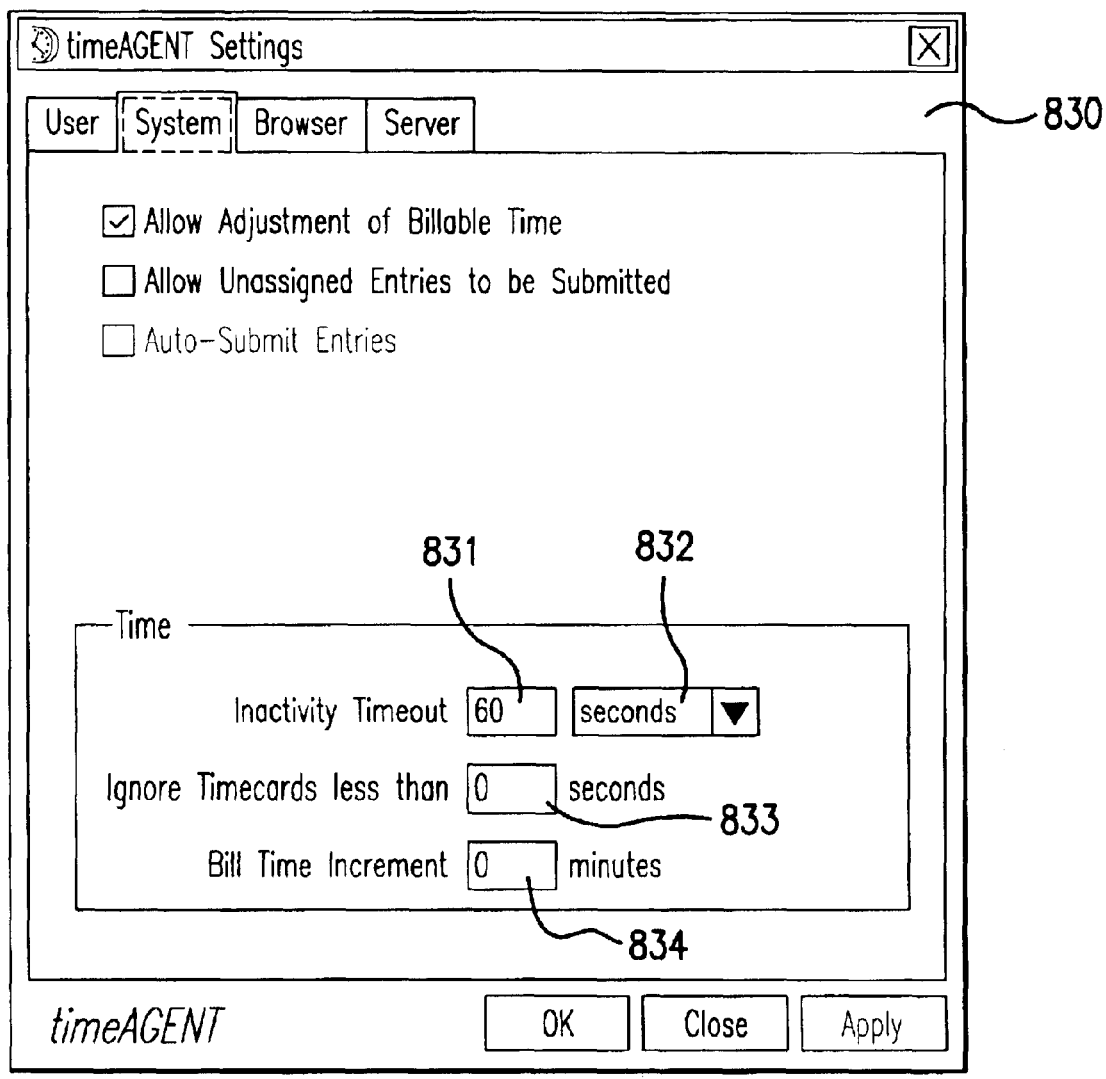
Figure 8C:
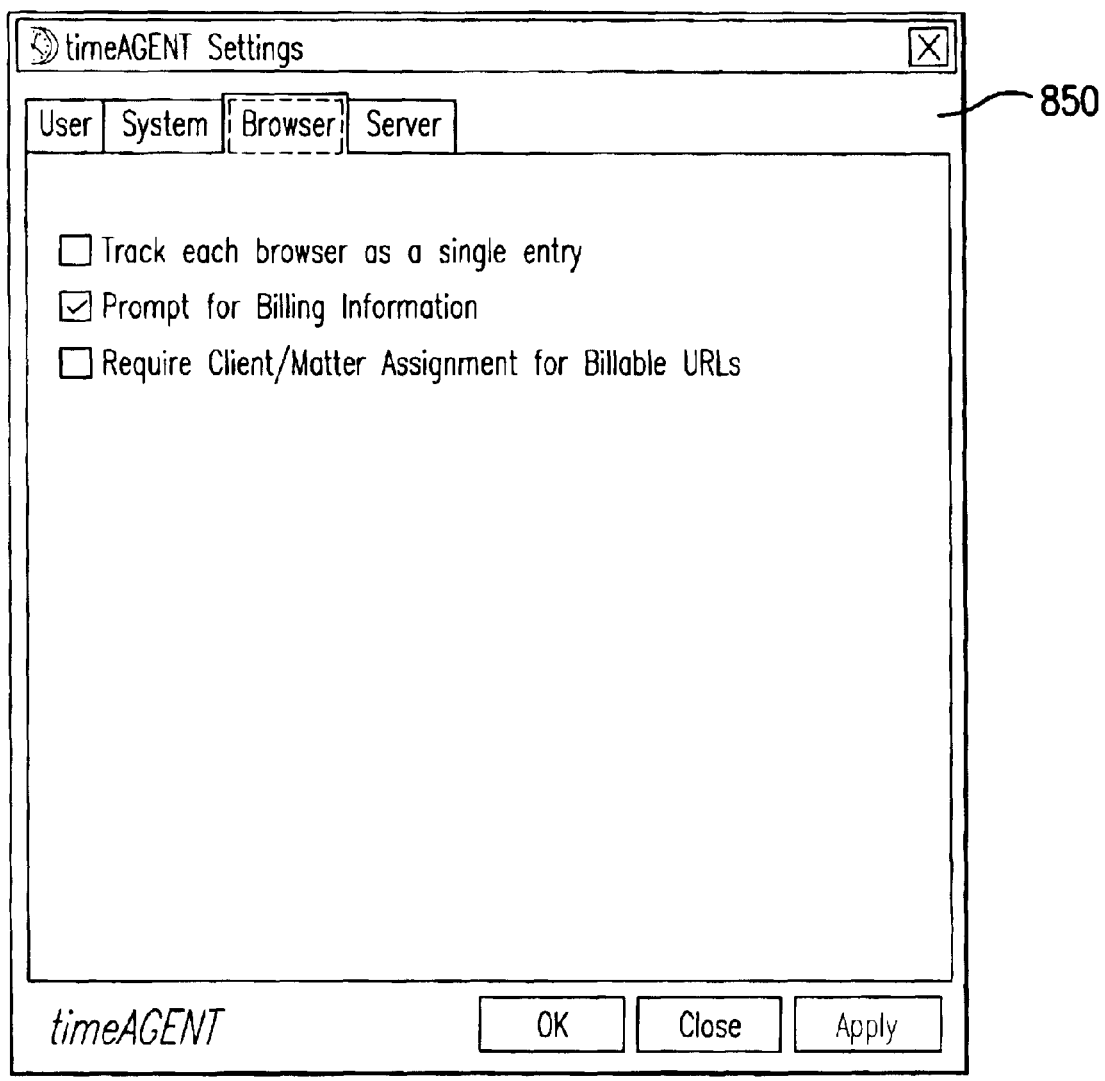
Figure 8D:
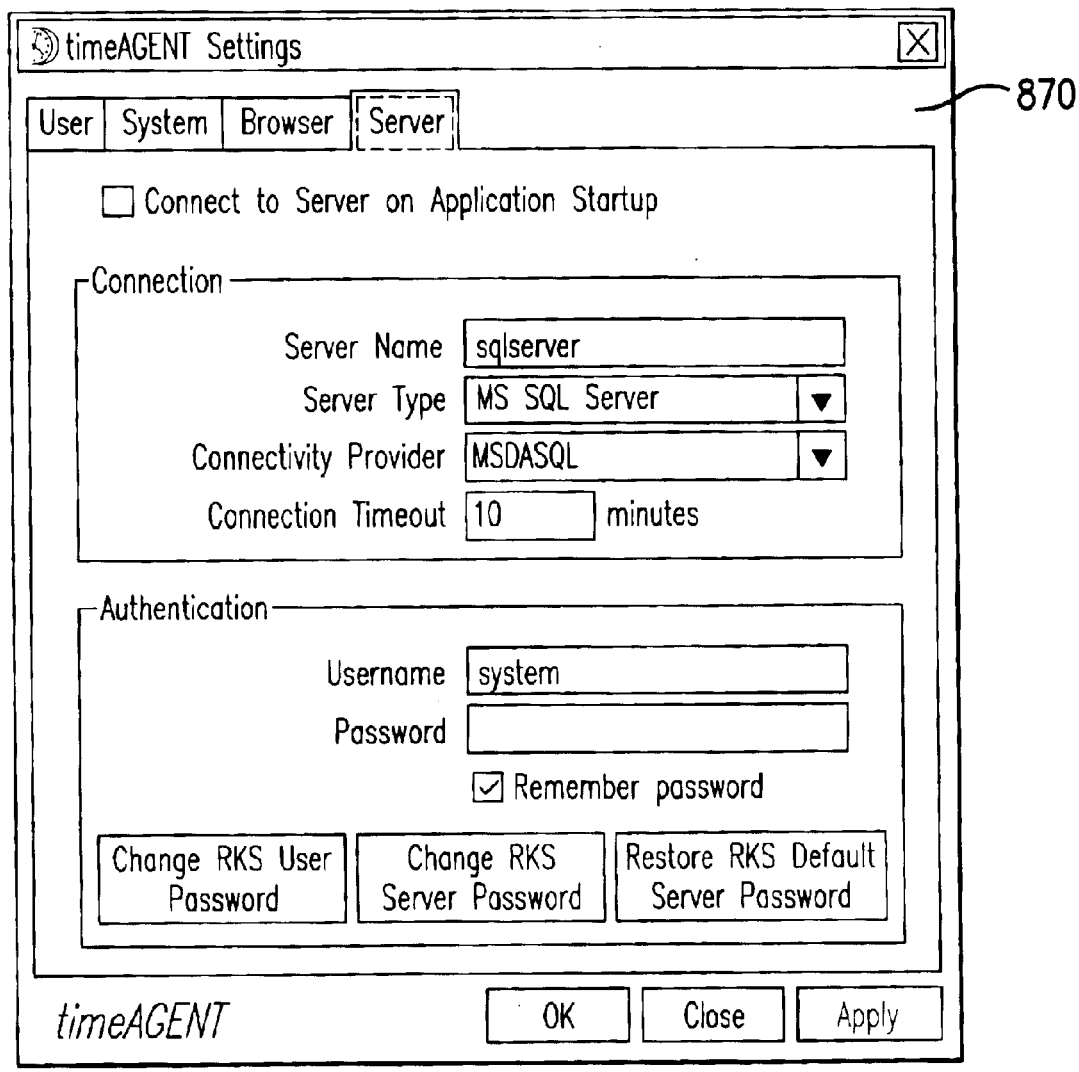

FIGS. 8(a), (b), (c) and (d) illustrate settings windows that show several features of the invention discussed above as well as several other features. Most of these features are self-explanatory and will not be discussed in further detail herein. Noteworthy features include the following: FIG. 8(a) shows a window 810 includes a checkbox 81 1 that allows the "SmartCapture" feature (the feature that automatically suggests categorizations) to be turned off and on as desired. FIG. 8(b) shows a window 830 that includes inactivity timeout fields 831, 832 that allow a user to configure the time keeping application to stop a timer (including manual timers 520 and timers maintained by the shell hook module 58 and the Corn Add-In module 54) if no activity has occurred in the window for a time specified in the inactivity timeout fields 831, 832. The window 830 also allows a user to specify that the system should ignore timecards when the amount of time spent on the task is less than the minimum entered in field 833. Still further, the user may configure the time keeping application to generate bills based on minimum time increments specified in the bill time increment box 834. FIGS. 8(c) and 8(d) show yet more features.

Figure 9A:
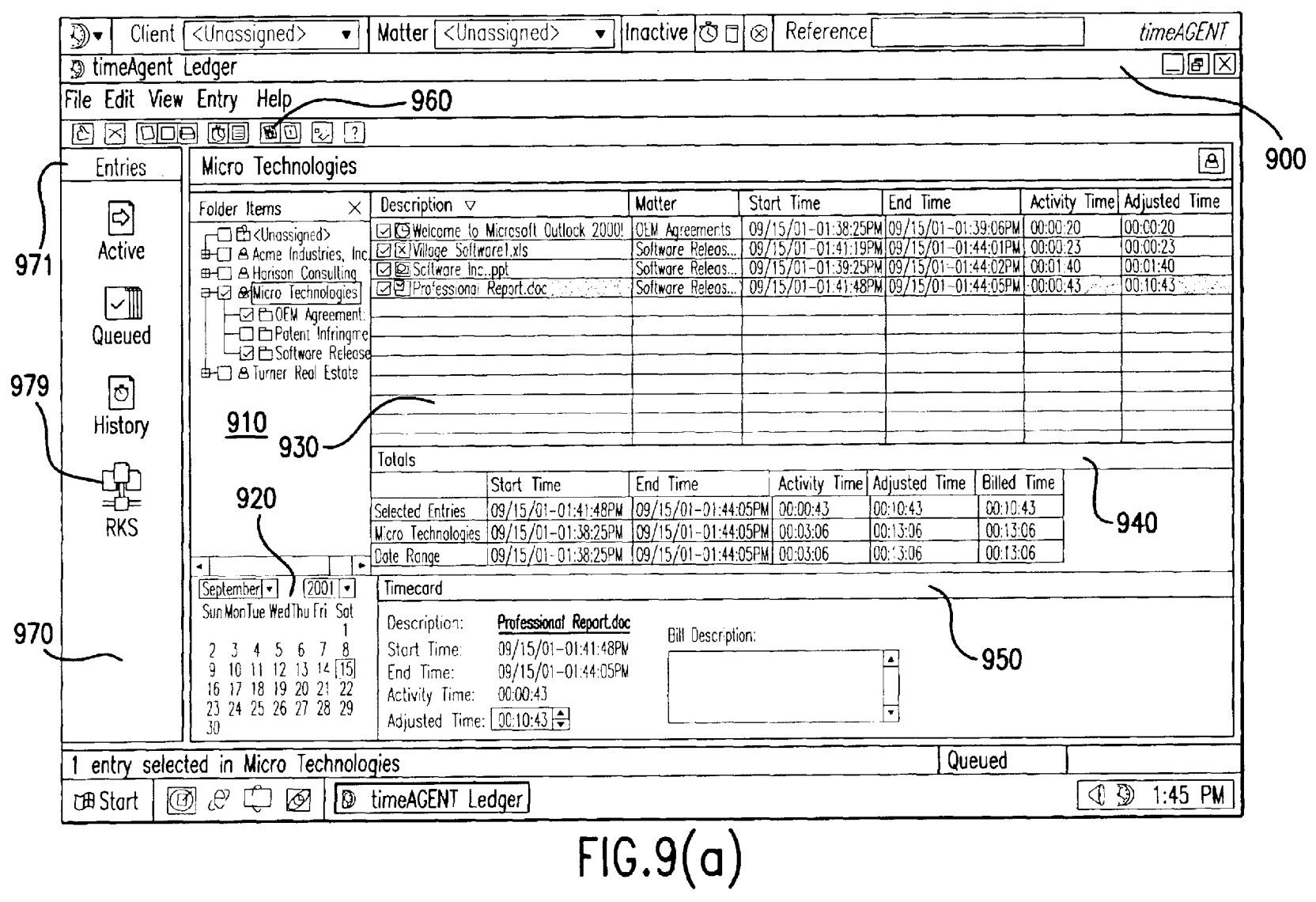
Figure 10:
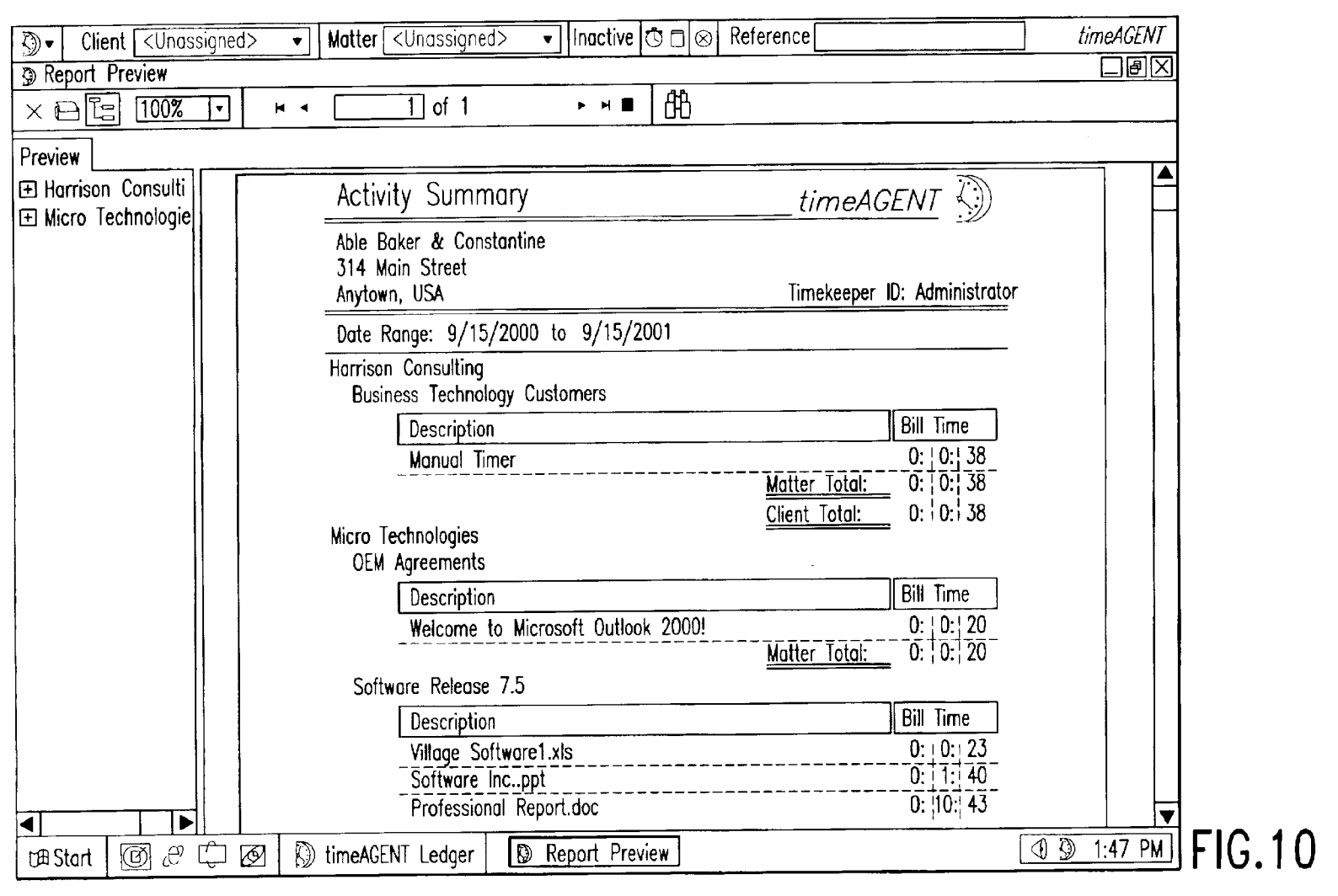

In preferred embodiments, the ledger application 30 allows a user to view and edit the contents of the activities database 32 through a ledger window 900 as shown in FIG. 9(a). The ledger window 900 includes a selection sub-window 910 including a hierarchical listing of categories, which in this case is clients and matters. The ledger window also includes a calendar sub-window 920 that allows the end user to specify days of interest. A single day, multiple days (whether or not concurrent), or all days can be selected. An activities window 930 displays the activities (which may have been aggregated to a single task) pertaining to the client and matter selected in the selection sub-window 910 for the day(s) selected in the calendar window 920. In preferred embodiments of the invention, clicking on an activity will automatically start an application and open a file associated with that activity. A totals window 940 shows totals for all of the activities for the client/matter and day selected in the windows 910, 920. A timecard window 950 allows an end user to adjust the time on, and add a billing description to, a timecard corresponding to an activity selected in the activities window 930. A create report icon 960 allows the creation of a report, an example of which is shown in FIG. 10. In embodiments of the invention that include an RKS 36, the field 970 will also include an RKS icon 979 that allows data stored in the RKS 36 (as opposed to the end user computer) to be displayed in the activities window 930.

Figure 9C:
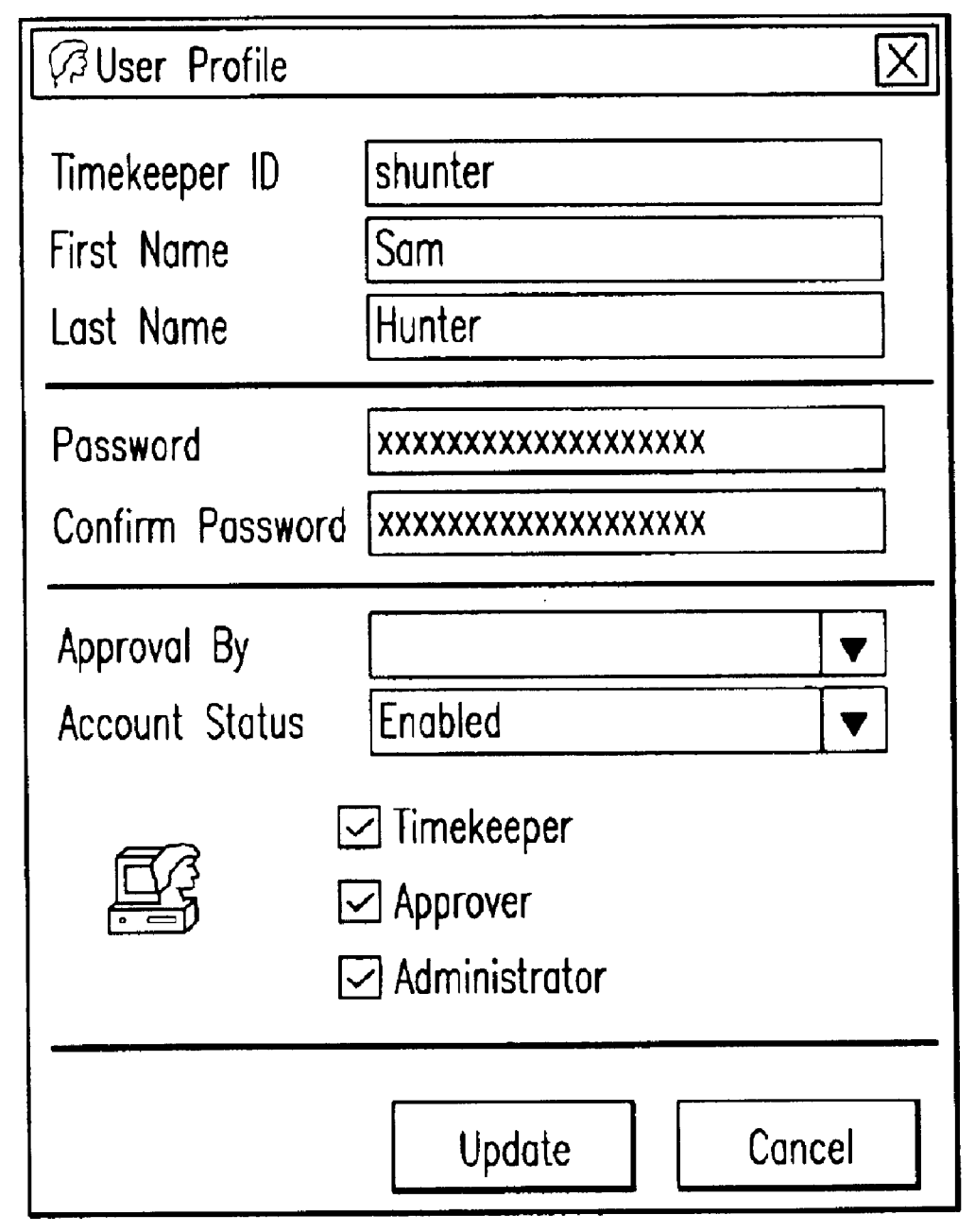

In embodiments of the invention including an RKS 36, each user can assume one or more of three roles: timekeeper, approver, and administrator, as shown in FIG. 9(c). A timekeeper is simply an end user. An approver is someone who is assigned with reviewing and approving time reported for timekeepers. An administrator is provided with the ability to add/remove timekeepers and approvers and update the URL tables and client/matters lists, etc. Pressing an administrator button 972 (which, although not shown in FIG. 9(a) but which will be present in the menu field of FIG. 9(a) for RKS embodiments and is shown in FIG. 9(b)) in the menu field 970 calls up the administrator window 990 shown in FIG. 9(b), which allows the administrator to perform the aforementioned functions. The administrator window 990 also includes a URLs icon 979, which allows for the modification of the aforementioned URL table.

In some preferred embodiments, category information may be available from a third party source. For example, document management programs such as PC Docs may require users to associate category information such as client and matter with files processed by the end user's computer 24. In such cases, the category information for activities may be retrieved from the document management program.

As discussed above, the various modules of the ATM 12 may report each instance where a timer associated with an application is stopped as a separate activity to the ledger application 30. In some embodiments, the ledger application may aggregate the separate activities into a single activity. In this manner, a single edit document activity will be reported for an end user who is interrupted several times by telephone calls while editing the document and who creates separate manual timers for each of these calls.

Obviously, numerous modifications and variations of the present invention are possible in light of the above teachings. It is therefore to be understood that within the scope of the appended claims, the invention may be practiced otherwise than as specifically described herein.

What is claimed is:

1. A computerized method for tracking time spent on tasks comprising the steps of:
    detecting a start time when a user begins to use an application to perform a task on an end user computer;
    detecting a stop time when a user stops performing the task;
    storing the start and stop times as an activity;
    calculating a score for at least one criteria and selecting the criteria based on the score;
    providing to the user a suggested category to which the activity corresponds, the suggested category being determined based at least in part on the criteria; and
    accepting a designated category from the user, the designated category not necessarily being the same as the suggested category;
    wherein either the start time or the stop time is detected through receipt of a message from the application.

2. The method of claim 1, further comprising the step of reporting the activity and the designated category to a computer system physically separate from the end user computer.

3. The method of claim 1, wherein the criteria is dependent upon the application.

4. The method of claim 3, wherein the application is a word processing application and the criteria is a directory in which a file being processed by the word processing application is located.

5. The method of claim 3, wherein the application is a word processing application and the criteria is a name of a file being processed by the word processing application.

6. The method of claim 3, wherein the application is an email application and the criteria is selected from the group consisting of a sender of an email, a subject of an email, and a recipient of the email.

7. The method of claim 3, wherein the application is an internet browser application and the criteria is a uniform resource locator.

8. The method of claim 3, wherein the application is a spreadsheet application and the criteria is a directory in which a file being processed by the spreadsheet application is located.

9. The method of claim 3, wherein the application is a spreadsheet application and the criteria is a name of a file being processed by the spreadsheet application.

10. The method of claim 3, wherein the application is a graphics application and the criteria is a directory in which a file being processed by the graphics application is located.

11. The method of claim 3, wherein the application is a graphics application and the criteria is a name of a file being processed by the graphics application.

12. The method of claim 1, further comprising the step of comparing the score to a threshold score, wherein the criteria is not selected if the score is below the threshold.

13. The method of claim 1, wherein the score for the criteria for each categorization is based at least in part upon a percentage of past tasks having the same criteria to which the categorization has been assigned.

14. A computerized method for tracking time spent on tasks comprising the steps of:
    detecting a start time when a user begins to use an application to perform a task on an end user computer;
    detecting a stop time when a user stops performing the task;
    storing the start and stop times as an activity;
    providing to the user a suggested category to which the activity corresponds; and
    accepting a designated category from the user, the designated category not necessarily being the same as the suggested category;
    wherein either the start time or the stop time is detected through receipt of a message from the application and wherein the suggested category is a multi-level hierarchical category.

15. The method of claim 1, further comprising the steps of:
    monitoring end user actions taken in performing the task; and
    detecting a stop time based on a user's failure to take an action during a period of time exceeding a threshold inactivity period.

16. The method of claim 15, wherein the action is an action selected from the group consisting of pressing a key on a keyboard and pressing a button on a mouse.

17. An end user computer comprising:
    a processor;
    a display connected to the processor; and
    at least one input device connected to the processor;
    wherein the processor is configured to perform the steps of
    detecting a start time when a user begins to use an application to perform a task on the end user computer;
    detecting a stop time when a user stops performing the task;
    storing the start and stop times as an activity;
    calculating a score for at least one criteria and selecting the criteria based at least in part on the score;
    displaying to the user a suggested category to which the activity corresponds,
    the suggested category being determined based at least in part on the criteria; and
    accepting a designated category from the user, the designated category not necessarily being the same as the suggested category;
    wherein either the start time or the stop time is detected through receipt of a message from the application.

18. The computer of claim 17, wherein the processor is further configured to perform the step of reporting the activity and the designated category to a second computer physically separate from the end user computer.

19. The computer of claim 17, wherein the criteria is dependent upon the application.

20. The computer of claim 19, wherein the application is a word processing application and the criteria is a directory in which a file being processed by the word processing application is located.

21. The computer of claim 19, wherein the application is a word processing application and the criteria is a name of a file being processed by the word processing application.

22. The computer of claim 19, wherein the application is an email application and the criteria is selected from the group consisting of a sender of an email, a subject of an email, and a recipient of the email.

23. The computer of claim 19, wherein the application is an internet browser application and the criteria is a uniform resource locator.

24. The computer of claim 19, wherein the application is a spreadsheet application and the criteria is a directory in which a file being processed by the spreadsheet application is located.

25. The computer of claim 19, wherein the application is a spreadsheet application and the criteria is a name of a file being processed by the spreadsheet application.

26. The computer of claim 19, wherein the application is a graphics application and the criteria is a directory in which a file being processed by the graphics application is located.

27. The computer of claim 19, wherein the application is a graphics application and the criteria is a name of a file being processed by the graphics application.

28. The computer of claim 17, wherein the processor is further configured to perform the step of comparing the score to a threshold score, wherein the criteria is not selected if the score is below the threshold.

29. The computer of claim 17, wherein the score for the criteria for each categorization is based at least in part upon a percentage of past tasks having the same criteria to which the categorization has been assigned.

30. An end user computer comprising:
    a processor;
    a display connected to the processor; and at least one input device connected to the processor;
    wherein the processor is configured to perform the steps of
    detecting a start time when a user begins to use an application to perform a task on the end user computer;
    detecting a stop time when a user stops performing the task;
    storing the start and stop times as an activity;
    displaying to the user a suggested category to which the activity corresponds; and
    accepting a designated category from the user, the designated category not necessarily being the same as the suggested category;
    wherein either the start time or the stop time is detected through receipt of a message from the application.

31. The computer of claim 17, wherein the processor is further configured to perform the steps of:

monitoring end user actions taken in performing the task; and detecting a stop time based on a user's failure to take an action during a period of time exceeding a threshold inactivity period.

32. The computer of claim 31, wherein the action is performed using the input device.

33. The computer of claim 32, wherein the input device is a keyboard.

34. The computer of claim 32, wherein the input device is a mouse.

* * * * *